United States Patent

[11] 3,563,512

[72] Inventor William L. Hauffe
 Warrensburg, Ill.
[21] Appl. No. 883,125
[22] Filed Dec. 8, 1969
[45] Patented Feb. 16, 1971
[73] Assignee Mueller Co.
 Decatur, Ill.

[54] TAMPERPROOF ROTARY VALVE ASSEMBLY
 11 Claims, 6 Drawing Figs.
[52] U.S. Cl. .................................................... 251/312
[51] Int. Cl. ..................................................... F16k 5/04,
 F16k 41/00
[50] Field of Search ............................................ 137/625.47,
 625.41, 625.24; 251/309, 312; 251/312

[56] References Cited
 UNITED STATES PATENTS
 3,241,570 3/1966 Mueller ......................... 251/312X
 3,360,236 12/1967 Huslander ...................... 251/312X
 3,419,248 12/1968 Berger ........................... 251/309

Primary Examiner—M. Cary Nelson
Assistant Examiner—Michael O. Sturm
Attorney—Cushman, Darby & Cushman ABSTRACT: A rotary valve assembly having a valve housing member with a flow passage therethrough and a key member which includes a valve member for coacting with valve seat means in the housing member. The key member is rotatable in a key seat in the housing member and means are provided to prevent unauthorized disassembly of the key member from the valve housing member. Additionally, means are provided to protect against corrosion at least between the key member and the key seat of said housing member whereby easy turning of the key member is insured throughout the life of the valve assembly. The means for making the valve assembly tamperproof against unauthorized disassembly includes utilization of a split snapring for preventing axial movement of the key member relative to the housing member and inaccessible from the exterior once the key member is assembled in the valve. A seal and anticorrosive coatings on pertinent parts of the valve assembly protect the split snapring and insure easy turning of the key member in its key seat.

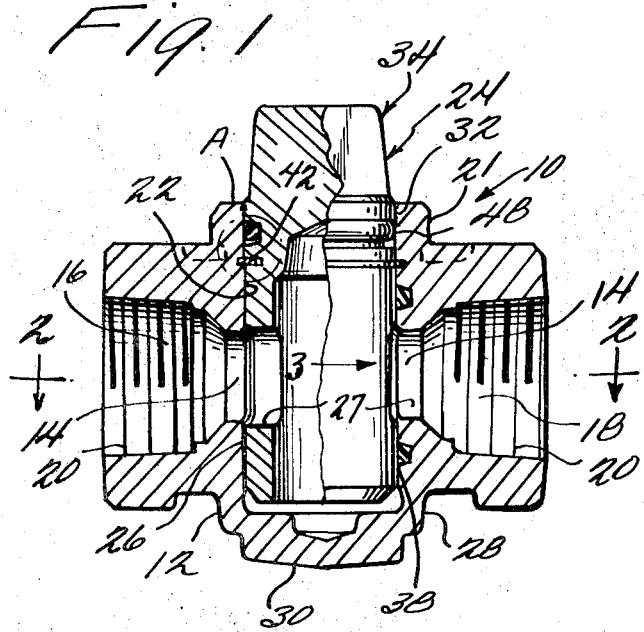
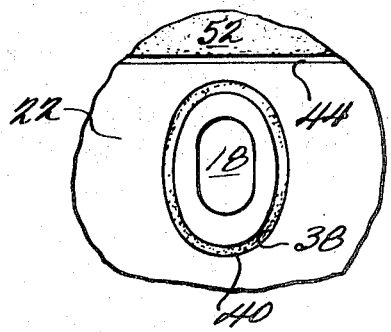
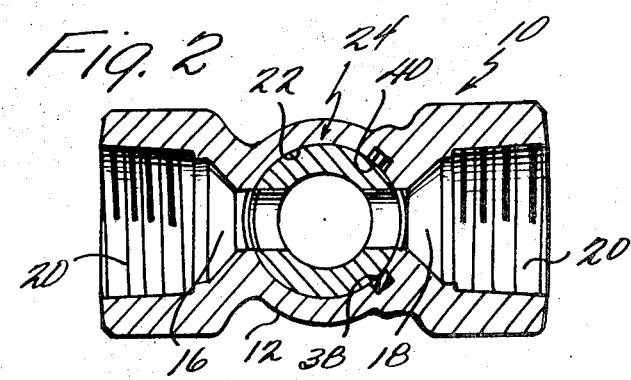
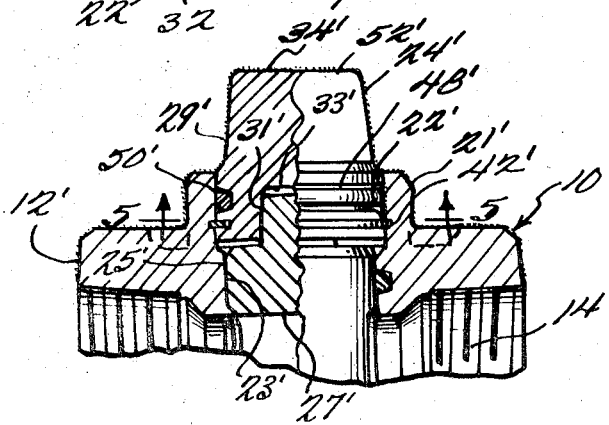
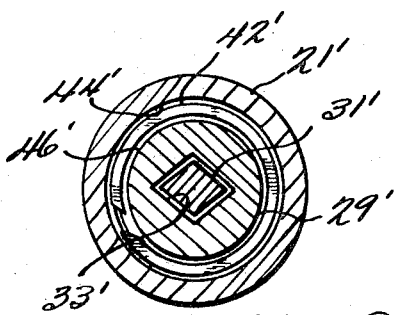
INVENTOR
WILLIAM L. HAUFFE

TAMPERPROOF ROTARY VALVE ASSEMBLY

The present invention relates generally to improvements in rotary valves of the type having a housing member with a flow passage therethrough and a key seat opening to the exterior of the housing member and at least to the flow passage, and a key member insertable into the key seat and retained therein for rotary movement, the key member including a valve member for opening and closing the flow passage. Valve assemblies of the type contemplated in the present invention are commonly used in supply lines for domestic gas, the same being connected into the line ahead of the gas meter and sometimes exteriorly of the dwelling and buried in the ground in a curb box or the like. These valves are commonly referred to as stops. It will be realized, however, that the invention is applicable to valves adapted for other uses and for other fluids.

BACKGROUND OF THE INVENTION

Past experience has shown that valve assemblies utilized as stops, such as meter stops or the like, are sometimes tampered with by unauthorized personnel. This is done in some instances by removing or attempting to remove the key member from the valve housing member and, thus, it is highly desirable to construct the valve assembly in a manner to prevent any form of tempering, as unauthorized disassembly may not only damage the valve assembly and impair its subsequent operation, but it also may result in gas leakage and consequent danger of explosion. Prior efforts have been made to render such stops tamperproof to an extent where they could not be disassembled with conventional tools, e.g. wrenches, pliers, screwdrivers, and the like, usually available to a householder. Such prior efforts resulted in a relatively complicated and cumbersome valve construction which is both costly to produce and difficult to assemble. Typical examples of prior efforts to assemble a key member in a valve housing member, so as to prevent the key member from being axially removed, include utilization of blind pins, bayonet connections, and locks operable by special tools or the like.

Prior art arrangements disclosing means for retaining key members in the valve housing member of rotary valve assemblies may be found in the following U.S. Pat. Nos.: 3,168,280, Mueller, Feb. 2, 1965; 3,254,872, Roos, Jun. 7, 1966; 3,257,096, Floren et al. Jun. 21, 1966; 3,333,812, Mueller, Aug. 1, 1967; 3,349,799, Mueller et al. Oct. 31, 1967; and 3,350,057, Luckenbill, Oct. 31, 1967.

In the above-mentioned prior art, various means are disclosed for retaining the key member in the valve housing member of a valve assembly. In some instances, the retaining means is such as to make removal of the key member impossible, whereas in other instances, the key member can be removed, but requires special tools. Additionally, the prior art discloses the use of split snaprings to retain the key member in the key seat of the valve housing member but such split snaprings were exposed or capable of exposure, whereby manipulation of a pointed instrument or screwdriver could be used to remove the same. The snaprings, if made of metal, were also exposed to the outside corrosive elements and thus, corrosive action of such elements on the retaining ring and adjacent relatively movable parts of the assembly would, in time, interfere with the operation to open and close the valve assembly.

BRIEF SUMMARY OF THE INVENTION

The present invention involves an improved valve assembly in which the key member, when once assembled in the valve housing member, cannot be removed therefrom for the life of the valve. This is accomplished by providing the valve housing member with a key seat opening at one end to the exterior of the housing member, and at the other end to the flow passage within the housing member, the bore of the key seat being provided with an annular groove that opposes an annular groove on the exterior of the key member when the key member is inserted. A split snapring having a radial thickness less than the overall radial extent of the opposed annular grooves is inserted into one of the grooves prior to assembly of the key member and the valve housing member, and then is either compressed or expanded, as the situation warrants, so that the key member can be slipped into the bore of the key seat, and when the two grooves are aligned with one another, the snapring returns to its relaxed position with its inner peripheral edge seated in the annular groove on the key member and its outer peripheral edge seated in the annular groove in the key seat.

Sealing means including an annular groove, either on the key seat or on the key member outwardly of the retaining ring groove and an O-ring seal therein, is provided for both preventing ingress and egress of fluids between the key seat and the key member. Such an O-ring seal effectively prevents the snap retaining ring from being exposed to corrosive elements from exterior of the valve assembly. Of course, other O-rings seals between the key seat and the key member may be provided for effecting a further seal, if necessary or desired.

To insure that the rotary valve assembly will be easy to operate throughout its intended life, either the key seat in the valve housing member of the key member, or both, at least outwardly of the O-ring seal therebetween, in the area of the relatively rotatable surfaces of the same, is provided with a noncorrosive coating which may be a fluidized bed coating, a galvanized coating, or a coating of an epoxy resin. Of course, the coating may also be a dry film lubricant where tolerances are particularly small and this further enhances easy turning of the key member to open and close the valve. Such dry film lubricants coatings may be molybdenum disulfide ($MOS_2$) in a binder, such as an epoxy or an alkyd resin paint, or Teflon. If desired, the entire exterior of the valve housing member and/or the key member could be coated with an anticorrosion coating. However, for easy operation and turning of the valve key member in the housing member, it is only necessary to have at least one of adjacent relatively rotatable surfaces so coated.

BRIEF DESCRIPTION OF THE DRAWINGS

FIG. 1 is a vertical sectional view with a portion of the valve key member being shown in elevation, the view illustrating a rotary valve assembly according to the present invention, whereby the valve body of the valve key member is a plug.

FIG. 2 is a sectional view taken substantially on the line 2-2 of FIG. 1.

FIG. 3 is a fragmentary developed layout view of the surface of the key seat in the valve housing member looking in the downstream direction of the arrow 3 in FIG. 1.

FIG. 4 is an enlarged fragmentary sectional view illustrating the portion of FIG. 1 encircled and identified by the letter A.

FIG. 5 is a fragmentary vertical sectional view with a portion of the key member being shown in elevation, the view representing a modification of the rotary valve assembly of FIG. 1.

FIG. 6 is a sectional view taken on the line 5-5 of FIG. 5.

DETAILED DESCRIPTION OF THE INVENTION

Referring now to the drawings, wherein like character or reference numerals represent like or similar parts, and in particular to the FIGS. 1-4 inclusive, there is shown a rotary valve assembly generally designated at 10 and having a valve housing member 12 provided with a flow passage 14 therethrough. One end of the flow passage 14 defines an inlet end portion 16 for the valve assembly 10, whereas the other end of the flow passage 14 defines an outlet end portion 18. Each of the inlet and outlet end portions 16 and 18, respectively, may be suitably threaded as indicated at 20, for receiving the threaded ends of fluid lines (not shown). The valve housing member 12 is provided with a generally cylindrical extension 2!, through which extends a key seat 22 open at its upper end to the flow passage 14 intermediate the inlet and outlet end portions 16 and 18, respectively. The key seat 22 in the particular environment disclosed may also represent a portion of the valve seat since the valve assembly 10 is illustrated with a key member 24 having a valve member or body 26 of the plug type which has a flow-way 27 therethrough. Since the housing member 12 is of the "closed bottom" type, a sleevelike annular extension 28 is provided with a closed, integral part or bottom 30, the sleevelike annular extensions receiving the lower portion of the plug-type valve member 26.

While the key member 24 is disclosed herein as having a plug-type valve member 26, it is, of course, within the scope of the present invention that the valve member may be a "butterfly" type of valve member, a soft-seated resilient plug or ball type rotary valve, an eccentric plug valve, or the like. Additionally, the plug-type valve member 26 is illustrated as a cylindrical plug, but of course, this could be a tapered plug or a ball plug, all of which are well known in the art.

The key member 24 is provided with a trunnion portion 32 which is substantially cylindrical and which is rotatable within the substantially cylindrical upper portion of the key seat 22. At the upper end of the trunnion portion 32, and extending outwardly of the housing member 12, the key member 24 is provided with a flattened noncircular head 34 for engagement by a wrench or the like (not shown), in order to turn the valve key member to open and close the flow passage 14 in the valve assembly 10.

Referring specifically to FIG. 3, there is disclosed the surface of the valve seat of key seat 22, looking toward the outlet portion 18 of the flow passage 14 in the valve housing member 10. In this view, the curved surface of the valve seat 26 is illustrated in a developed plan view and it will be noted that the outlet portion 18, which defines the port opening to the key seat, is elongated in this area. An endless groove 38 is provided around the elongated port opening of the outlet end portion 18, the groove being a true ellipse with a major and minor axis. Groove 38 is arranged to receive an O-ring seal 40 of sufficient radial size to provide sealing engagement with the opposed surface of the valve plug member 26. By having the endless groove 38 elliptical in shape and extending about the elongated port opening of the outlet end portion 18, a minimum size O-ring 40 may be utilized. Also, by having the O-ring 40 positioned around the downstream port opening of outlet end 18 of the flow passage 14 and by having the O-ring in an elliptical groove, there is less chance of line pressure blowing the O-ring from the groove during operation of the valve assembly 10 as the pressure tends to force the O-ring into the groove and the pressure is more uniform on the groove. In prior art disclosures, such as the aforementioned Mueller, U.S. Pat. No. 3,333,812 (FIGS. 12 and 13), such grooves for carrying the O-ring about an elongated port appeared to be elliptical but were actually circular, as they were shown on a curved surface, rather than on a developed plan surface.

Referring now in particular to FIGS. 1 and 4, the key member 24 is retained in the key seat 22 by means of a retaining snapring 42 spaced a considerable distance from the opening of the key seat 22 to the exterior of the valve housing member 12. In more detail, the key seat 22 is provided with an annular groove 44 (FIG. 4), whereas the key member 24 is also provided with an annular groove 46 circumscribing the same. When the key member 24 is positioned in the key seat 22, the two grooves oppose one another and thus define a chamber for the split retaining ring 42. The split retaining ring 42 has a radial thickness less than the overall radial extent of the end walls of the opposed annular grooves 44 and 46, so that the ring 42 may be compressed or expanded into one of the grooves, as the situation warrants, prior to assembly of the key member 24 into the valve housing member 12. When the key member 24 is inserted into the key seat 22 of the housing member 12, and the grooves 44 and 46 become aligned, then the split snapring 42 will return to its relaxed position with its inner peripheral edge seated in the groove 46 and its outer peripheral edge seated in the groove 44. Preferably, the radial thickness of the snapring 42 is approximately equal to the radial extent of one of the grooves 44 and 46 so that the ring can be compressed or expanded completely into one of the grooves prior to assembly, thus providing sufficient clearance for assembly of the key member 24 into the key seat 22 in valve housing member 12. When the retaining ring 42 is positioned into the grooves 44 and 46, as shown in FIG. 4, then the key member 24 cannot be removed from the valve housing member 12 for the life of the valve assembly, as there is no way to reach the ring 42 from the exterior of the valve assembly to compress or expand the same, as the case may be.

The ring 42 is usually made of metal and thus could be subjected to corrosion from corrosive elements adjacent the exterior of the valve assembly 10, thus impairing operation of the same. To avoid this and to also provide means for sealing against ingress or egress of fluids between the key seat 22 and the key member 24, an O-ring seal 48 is provided outwardly of the ring 42, but inwardly of the opening of the key seat 22 to the exterior of the valve housing member 12. In more detail, an annular groove 50 is provided on the key member 24 in the trunnion portion 32 thereof outwardly of the groove 46, and the O-ring 48 is positioned therein and has a radial section sufficient to provide a seal between the key seat 22 and the key member 24. It will now be understood that the O-ring has a dual function, namely to prevent egress of fluids from the flow passage 14 to the exterior of the valve assembly, and to prevent ingress of fluids and corrosive elements from the exterior of the valve assembly to an area where they might provide corrosion to the ring 42, and thus interfere with operation of the valve assembly during its normal life span. While the groove 50 has been shown as on the key member 24, it will be appreciated that the groove could be in the surface of the key seat 22, if so desired.

To further insure easy operation of the rotary valve assembly 10 throughout its intended life, the surface of the key seat 22 or the surface of the key member 24, or both, at least outwardly of the O-ring 48, is coated with a noncorrosive coating 52 (FIGS. 3 and 4). This protects the relatively rotatable surfaces of the valve assembly 10 from exterior corrosive elements in the only area not protected by the O-ring seal 48.

The noncorrosive coating 52 may be fluidized bed coating, a galvanized coating, an epoxy resin coating, or a dry film lubricant coating. In some instances, either the entire valve housing member 12 or the entire key member 24, or both, may be coated where the application techniques for the coating would make the same easier, or where possibly the valve assembly 10 is being used in a fluid system with fluids having corrosive elements therein. In this latter-mentioned situation, the metal valve housing member 12 and the metal key member 24 would be protected inwardly of the O-ring seal 48 between their relatively rotatable surfaces. If one of the elements of the valve assembly 10 is made of a noncorrosive material, it is still desireable to provide a noncorrosive coating on the other element in the area where there are relatively rotatable surfaces, as this prevents the buildup of corrosion, which would reduce the operating clearances and interfere with the tuning operation of the valve.

Referring now to FIGS. 5 and 6, there is disclosed a modification of the valve assembly of the present invention and identical parts will be given the same numerals as those parts described in FIGS. 1–4 inclusive, whereas similar parts will be given numerals with a suffix. The valve assembly 10' includes a valve housing member 12' having a flow passage 14 therethrough. A key seat 22' is provided in the housing member 12' and extends through a generally cylindrical extension 21', the key seat opening to the exterior of the housing member and to the flow passage 14 at its inner end. Key seat 22' includes an inner portion 23' of reduced diameter defining the valve seat for a key member 24'.

Key member 24' differs from the aforedescribed key member 24, in that it is not an integral member and includes a generally cylindrical valve plug member 25' rotatable in the valve seat 23' by a cap member 29' rotatable in the upper portion of the key seat 22'. In more detail, the valve plug member 25', which is provided with a flow-way 27' therethrough, has a reduced portion 31' of noncircular cross section on its upper end, which terminates inwardly of the opening of the key seat 22' to the exterior of the valve housing member 12'. Cap member 29' is provided with a noncircular recess 33' on its inner end complementary to the noncircular reduced end portion 31' of the valve plug and is received therein. The upper end of the cap member 29' is provided with a flattened noncircular head 34' for receiving a wrench or the like (not shown) to turn the cap member, and thus rotate the valve plug member to open and close the valve assembly.

The exact same arrangement as shown in FIGS. 1 and 4 is provided for retaining the cap member 29' in the key seat 22' and thus, the key member 24' comprising the cap member 29' and the valve plug member 25' are retained when once assembled in the valve housing member 12', so that they cannot be disassembled for the life of the valve assembly. The cap member 29' is held in position by the split snapring 42' provided in grooves 44' and 46' in the respective parts.

The O-ring seal 48' in a groove 50' prevents egress of fluids from the flow-way 14, and ingress of the fluids from the exterior of the valve assembly 10'. In this particular modification of the present invention, the valve housing member 12' and the key member 24' are each shown with a noncorrosive coating 52' thereon. Of course, the valve assembly 10 of FIG. 1 could be so coated, or as explained above, one or the other of the elements making up the valve assembly could be so coated. However, in most instances it is only necessary to coat the relatively rotatable surfaces outwardly of the O-ring seal of the particular valve assembly.

The terminology used throughout this specification is for the purpose of description and not limitation, the scope of the invention being defined in the claims.

I claim:

1. A rotary valve assembly comprising: a valve housing member having a low passage therethrough with ends defining an inlet and an outlet, said valve housing member further having a generally cylindrical key seat with an opening at one end to the exterior of the housing member and an opening at the other end to the flow passage within the interior of the valve housing member, seat means in said housing member; a key member rotatable in said key seat of said housing member and including a valve member for coacting with said valve seat means to open and close said flow passage; means to retain said key member against axial movement relative to said housing member and to prevent said key member from being removed from said housing member, said last-mentioned means including an annular groove in said key seat, an annular groove in said key member opposing said annular groove in said key seat, and a split retaining ring having its inner peripheral edge seated in the annular groove in said key member and its outer peripheral edge seated in the annular groove in said key seat; and means outwardly of said key member retaining means and inwardly of the opening of said key seat to the exterior of said housing member for providing a seal against egress of fluid from the interior to the exterior of the housing member and the ingress of fluid and/or abrasive material from without said housing member to said split retaining ring.

2. A rotary valve assembly as claimed in claim 1 in which said sealing means outwardly of said key member retaining means includes an annular packing groove in one of said key seat and said key member, and an O-ring positioned in said groove and of sufficient size in radial section to form a seal between said key seat and said key member.

3. A rotary plug valve assembly as claimed in claim 2, including means at least outwardly of said O-ring for preventing corrosion between said key seat and said key member.

4. A rotary valve assembly as claimed in claim 3, in which said last-mentioned means includes an anticorrosive coating on the surface of at least one of said key seat and said key member.

5. A rotary valve assembly as claimed in claim 4, in which said split retaining ring is metallic and in which said O-ring seal protects said retaining ring from corrosion.

6. A rotary valve assembly as claimed in claim 4 in which said anticorrosive coating is a galvanized coating.

7. A valve assembly as claimed in claim 4, in which said anticorrosive coating is an epoxy resin.

8. A rotary valve assembly as claimed in claim 4, in which said anticorrosive coating is a dry film lubricant.

9. A rotary valve assembly as claimed in claim 4, in which said valve member is a plug member having a flow-way therethrough.

10. A rotary valve assembled as claimed in claim 9, in which said key member includes a cap member rotatable in said key seat and having a noncircular recess in its inner end and in which said plug member has a reduced portion of noncircular cross section received in said cap member.

11. A valve assembly as claimed in claim 9, in which the flow-way through said plug member is elongated in cross section and in which said flow passage in said housing member is also elongated in cross section at least in an area where it cooperates with said flow-way through said plug member, and in which said valve seat means includes an elliptical groove in said housing member surrounding the outlet of said flow passage and an O-ring in said elliptical groove of sufficient size to seal with said plug.